United States Patent [19]

Wiseman et al.

[11] Patent Number: 5,380,799
[45] Date of Patent: Jan. 10, 1995

[54] MOLDABLE RESIN COMPOSITION

[75] Inventors: Dean H. Wiseman, Jacksonville, Fla.; Masamichi Togo, Osaka, Japan

[73] Assignee: Reichhold Chemicals, Inc., Durham, N.C.

[21] Appl. No.: 175,606

[22] Filed: Dec. 30, 1993

Related U.S. Application Data

[62] Division of Ser. No. 815,377, Dec. 31, 1991, Pat. No. 5,306,773.

[51] Int. Cl.$^6$ .......................... C08F 8/00; C08L 63/00
[52] U.S. Cl. .................................................. 525/111
[58] Field of Search ........................................ 525/111

[56] References Cited

U.S. PATENT DOCUMENTS

| | | | |
|---|---|---|---|
| 3,431,320 | 3/1969 | Baum et al. | 260/865 |
| 3,594,439 | 7/1971 | Baker | 260/863 |
| 3,721,722 | 3/1973 | Baum | 260/862 |
| 3,810,863 | 5/1974 | Hatton, Jr. et al. | 260/40 R |
| 3,969,311 | 7/1976 | Kubota | 260/40 R |
| 4,016,116 | 4/1977 | Poy | 260/2.5 P |
| 4,062,826 | 12/1977 | Hutchinson et al. | 260/40 TN |
| 4,083,890 | 4/1978 | Drake et al. | 260/836 |
| 4,172,059 | 10/1979 | Atkins et al. | 260/22 CB |
| 4,273,689 | 6/1981 | Smearing | 260/22 CB |
| 4,288,571 | 9/1981 | Comstock et al. | 525/170 |
| 4,294,751 | 10/1981 | Gardner | 206/40 R |
| 4,294,941 | 10/1981 | Owen, Jr. | 525/171 |
| 4,320,045 | 3/1982 | Owen | 523/523 |
| 4,525,498 | 6/1985 | Atkins et al. | 523/511 |
| 4,673,706 | 6/1987 | Atkins | 525/31 |
| 4,698,411 | 10/1987 | Hill, Jr. et al. | 528/303 |
| 4,826,885 | 5/1989 | Tsai | 521/176 |
| 4,829,106 | 5/1989 | Holoch et al. | 523/506 |
| 4,839,446 | 6/1989 | Culbertson et al. | 525/504 |
| 4,880,846 | 11/1989 | Tufts et al. | 521/129 |
| 4,935,453 | 7/1990 | Bock et al. | 521/113 |

*Primary Examiner*—Melvyn I. Marquis
*Assistant Examiner*—Helen F. Lee
*Attorney, Agent, or Firm*—Bell Seltzer Park & Gibson

[57] ABSTRACT

A resin composition moldable at room temperature comprising a thermosetting unsaturated polyester resin, a mixture of thermoplastic polymers of vinyl acetate and an epoxy compound having at least one 1,2-epoxy group per molecule, a dialkyl-p-toluidine accelerator, a low temperature free radical peroxide initiator such as a blend of cumene hydroperoxide and acetyl acetone peroxide, and an alkali metal or transition metal compound capable of reacting with the free radical initiator to initiate polymerization of the unsaturated polyester resin.

19 Claims, No Drawings

MOLDABLE RESIN COMPOSITION

This application is a divisional of pending prior application Ser. No. 07/815,377, filed 31 December 1991 now U.S. Pat. No. 5,306,773, the disclosure of which is incorporated herein by reference in its entirety.

FIELD OF THE INVENTION

This invention relates to a resin composition, and more particularly to an unsaturated polyester resin composition moldable at room temperature.

BACKGROUND OF THE INVENTION

Unsaturated polyester resins, and particularly reinforced unsaturated polyester resins have wide commercial utility in manufacturing such items as automotive parts, boat hulls, bath and kitchen fixtures (e.g., sink basins, vanity tops, shower units, etc.), aerospace parts, storage tanks and the like. Various fabrication techniques can be used, including among others, hand lay-up, matched metal-die molding, compression molding including the use of sheet molding compound ("SMC") and bulk molding compound ("BMC"), transfer molding, injection molding, and resin transfer molding ("RTM"). Unsaturated polyester resins often have to be cured at elevated temperatures (e.g., temperatures greater than about 40° C. and often greater than about 120° C.) to gain the desired properties, and particularly the desired surface properties. Exposure to elevated temperatures, however, is often detrimental to the quality of the resulting molded article. Moreover, expensive tooling made from heat resistant materials (e.g., steel and chrome) and having means for providing heat to the tool often have to be utilized.

Molding at elevated temperatures is usually required when attempting to mold articles (e.g., automotive exterior parts) that require a smooth surface quality, known as Class A surfaces, and exhibit reduced shrinkage and warpage. When molding Class A articles, compression molding techniques are conventionally used in conjunction with a low profile additive added to the resin. See, for example, U.S. Pat. Nos. 4,525,498 to Atkins et al., 4,172,059 to Atkins et al., and 3,701,748 to Kroekel.

Despite the general availability of unsaturated polyester resins using such additives, there continues to be a need for improvements in molding resins, and particularly molding unsaturated polyester resins at room temperature. Resins that cure (mold) at room temperature have heretofore not been entirely successful when used in molding Class A articles. Conventional thinking is that elevated molding temperatures (e.g., on the order of 120° C. to 160° C.) are necessary to obtain Class A surfaces.

SUMMARY OF THE INVENTION

With the foregoing in mind, it is an object of the invention to provide an unsaturated polyester resin composition which is moldable at room temperature.

It is another object of the invention to provide an unsaturated polyester resin composition which is moldable at about room temperature using compression molding and RTM techniques.

It is still another object of the invention to provide an unsaturated resin composition which is moldable at room temperature and provides an article having Class A surface quality.

These and other objects of the invention are provided by the resin composition of the present invention. It has been discovered that a resin composition comprising a thermosetting unsaturated polyester resin, a mixture of thermoplastic polymers of vinyl acetate and an epoxy compound having at least one 1,2-epoxy group per molecule, a dialkyl-p-toluidine accelerator, a free radical initiator comprising a low temperature free radical peroxide initiator such as methyl ethyl ketone peroxide, benzoyl peroxide, t-butyl hydroperoxide and others known in the art, and particularly a blend of cumene hydroperoxide and acetyl acetone peroxide, and an alkali metal or transition metal compound capable of reacting with the free radical initiator to initiate polymerization of the unsaturated polyester resin can be molded at or about room temperature (i.e., at temperatures of about 20° C. to about 40° C.) to give Class A surfaces and low shrinkage. Preferably, the transition metal compound is cobalt naphthenate or cobalt octoate.

Additionally, the resin composition can include fillers (e.g., calcium carbonate, alumina powder, hydrated alumina, quartz powder, crushed silica, etc.) and/or reinforcement fibers (e.g., fibers of glass, carbon, aromatic polyamides, etc.). The present resin composition is unlike existing resin compositions in that the resin composition can be molded at room temperature and can still be used to provide Class A surface quality.

The present invention also relates to a method of producing a molded article comprising the steps of forming a resin composition comprising a thermosetting unsaturated polyester resin, a mixture of thermoplastic polymers of vinyl acetate and an epoxy compound having at least one 1,2-epoxy group per molecule, a dialkyl-p-toluidine accelerator, a low temperature free radical peroxide initiator such as a blend of cumene hydroperoxide and acetyl acetone peroxide, and an alkali metal or transition metal compound capable of reacting with the free radical initiator to initiate polymerization of the unsaturated polyester resin, forming a shaped article from the resin composition, and subjecting the shaped article to a temperature of about 20° C. to about 40° C. to polymerize the thermosetting unsaturated polyester resin to provide a molded article having a Class A surface and low shrinkage.

DESCRIPTION OF THE PREFERRED EMBODIMENTS

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As summarized above, the resin composition of the present invention is moldable (curable) at room temperature. The resin composition comprises a thermosetting unsaturated polyester resin, a mixture of thermoplastic polymers of vinyl acetate and an epoxy compound having at least one 1,2-epoxy group per molecule, dialkyl-p-toluidine accelerator, a free radical peroxide initiator (e.g., a blend of cumene hydroperoxide and acetyl acetone peroxide), and an alkali metal or transition metal salt capable of reacting with the free radical initiator to initiate polymerization of the unsaturated polyester resin.

Preferably, the resin composition comprises about 50 to about 75 percent by weight of thermosetting unsaturated polyester resin; about 5 to about 15 percent by weight of the mixture of thermoplastic polymers of vinyl acetate and the epoxy compound having at least one 1,2-epoxy group per molecule, about 0.05 to about 0.5 percent by weight dialkyl-p-toluidine accelerator, about 0.5 to about 3 percent by weight of the free radical peroxide initiator, and about 0.05 to about 0.5 percent by weight of the alkali metal or transition metal salt capable of reacting with the free radical initiator to initiate polymerization of the unsaturated polyester resin. Additionally, the resin composition can include fillers, inhibitors, reinforcement fibers and the like.

Suitable unsaturated polyester resins include practically any esterification product of a polybasic organic acid and a polyhydric alcohol, wherein the acid provides the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The unsaturated polyester resins are generally crosslinked with a compatible crosslinking monomer such as styrene, vinyl toluene, methyl methacrylate, methyl styrene, divinyl benzene, diallyl phthalate and the like. The amount of crosslinking monomer is about 10 percent to about 65 percent, and preferably about 25 percent to about 55 percent by weight of the unsaturated polyester resin.

The polyester resin can also be mixed or blended with other thermosetting resins. For example, the polyester resin can be mixed with a crosslinkable polyurethane such as described in U.S. Pat. No. 4,062,826 to Hutchinson et al, the disclosure of which is incorporated herein by reference. The use of other thermosetting resins and blends thereof will be within the skill of one in the art.

Exemplary mixtures of thermoplastic polymers of vinyl acetate and of epoxy compounds having at least one 1,2-epoxy group per molecule are described in U.S. Pat. No. 4,525,498 to Atkins et al., the disclosure of which is incorporated herein by reference. Suitable thermoplastic vinyl acetate polymers are polyvinyl acetate homopolymers and thermoplastic copolymers containing at least 50 percent by weight vinyl acetate. Such polymers include, for example, vinyl acetate homopolymer; carboxylated vinyl acetate polymers including copolymers of vinyl acetate and ethylenically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer, and the like. The useful vinyl acetate polymers typically have molecular weights within the range of from about 10,000 to about 250,000, and preferably from about 25,000 to about 175,000.

Suitable epoxy compounds having at least one 1,2-epoxy group per molecule can be based on aliphatic, cycloaliphatic or aromatic backbones. One class of preferred thermosetting epoxy resins can be represented by the formula:

wherein n is an integer representing the number of repeating units and has a value of 0 to about 10 and Z is an arylene radical having 6 to about 20 carbons. The preferred arylene radical is:

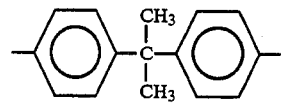

Still another preferred class of thermosetting epoxy resins are the 1,2-cycloaliphatic diepoxides such as 3,4-epoxycyclohexylmethyl 3,4-epoxycyclohexane carboxylate, bis(2,3-epoxycyclopentyl)ether, vinyl cyclohexane dioxide, and 2-(2,4-epoxycyclohexyl-5,5-spiro)-(3,4-epoxy)cyclohexane-m-dioxane. It is noted that the mixture has previously been used as a low profile additive ("LPA") in molding articles to reduce volume shrinkage such as described in U.S. Pat. No. 4,525,498 to Atkins, et al.

Exemplary dialkyl-p-toluidine accelerators are dimethyl-p-toluidine, diethyl-p-toluidine and the like. The dimethyl-p-toluidine accelerator is preferred and is available, for example, from RSA Corporation of Ardsley, N.Y.

Suitable free radical peroxide initiators include t-butyl hydroperoxide, t-butyl perbenzoate, benzoyl peroxide, methyl ethyl ketone peroxide, and others known in the art. Preferred initiators are methyl ethyl ketone peroxide and a blend of cumene hydroperoxide and acetyl acetone peroxide. The blend of cumene hydroperoxide and acetyl acetone peroxide is typically about a 1:1 to about 1:9 blend, with a blend of from about 1:4 to 1:5 cumene hydroperoxide to acetyl acetone peroxide being preferred.

Exemplary alkali metal and transition metal salts capable of reacting with the free radical initiator to initiate polymerization include acetate, butyrate, benzoate, capronate, laurate, palmitate, octoate, propionate and naphthenate salts of Na, K, Li, Pb, Fe, Co, Ni, Zn and V. A preferred transition metal salt is cobalt naphthenate or cobalt octoate.

The resin composition can also include an inhibitor to give shelf stability and adjust gel time. Exemplary inhibitors include tertiary butyl catechol, hydroquinone, p-benzoquinone, monotertiary butyl hydroquinone, 1,4-napthoquinone, toluhydroquinone, and di-tert-butyl-p-cresol. Preferably, the amount of inhibitor in the resin composition ranges from about 0.05 to about 0.5 percent by weight.

The resin composition can optionally include a filler such as calcium carbonate (e.g., SnowFlake available from ECC America, Inc. of Sylacauga, Ga.), alumina powder, hydrated alumina, quartz powder, crushed silica, calcium sulfate, kaolin, talc and the like. Preferably, the amount of filler in the resin composition ranges from about 25 to about 200 percent by weight.

The resin composition optionally can include reinforcement fibers. Suitable reinforcement fibers include fibers of glass, carbon, aromatic polyamides, ceramic and various metals. The fibers are used in amounts of about 5 to about 75 percent, and preferably about 20 to 60 percent by weight based on the weight of the resin composition. Also, a veil mat can be used.

A suitable resin composition is Polylite® 31-520 available from Reichhold Chemicals, Inc. Polylite® 31-520 is a mixture of unsaturated polyester resins having a very high ethylenic unsaturation, XLPR-85D44 (a mixture of thermoplastic vinyl acetate and epoxy compound having at least one 1,2 epoxy group per molecule available from Union Carbide, Charleston, W. Va.), dimethyl-p-toluidine accelerator, a blend of cumene hydroperoxide and acetyl acetone peroxide, cobalt octoate promoter, and tertiary butyl catechol inhibitor.

In operation, the resin composition is formed by mixing together the individual constituents and forming the composition into a shaped article using any of the various known molding techniques (e.g., hand lay-up, compression molding, RTM, and the like). The resin composition is molded at room temperature or slightly above (e.g., of about 20° C. to about 40° C.) at a pressure of about 1 atm to about 100 atm to form the molded article with or without vacuum assist to get the resin in the mold.

Additional benefits and advantages of the invention will be apparent in the following illustrative example. Unless otherwise noted, all parts and percentages are by weight of the resin composition.

EXAMPLE

A paste mixture of the resin composition is prepared comprising 100 parts by weight Polylite® 31-520 which comprises:

a. 87 parts by weight styrenated unsaturated polyester resin having a high ethylenic unsaturation,
b. 13 parts by weight Union Carbide XLPR-85D44, a styrenated mixture of thermoplastic polymers of vinyl acetate and an epoxy compound having at least one 1,2 epoxy group per molecule,
c. 0.4 parts by weight dimethyl-p-toluidine accelerator,
d. 1.25 parts by weight of a 1:4 blend of cumene hydroperoxide and acetyl acetone peroxide, and
e. 0.4 parts by weight cobalt octoate;

100 parts by weight calcium carbonate; and 35 parts by weight of glass made up of 10 mil Veil backed up with 1½ oz. chopped strand glass fiber mat available from Nicofibers Inc. of Shawnee, Ohio. The gel time of the mixture is about 4 minutes and the mix temperature is about 27° C. The paste mixture is placed in a polyester mold coated with a release wax. Each layer of glass fiber mat is laid out, wet with the paste mixture, and rolled out with a hand lay up roller. Multiple layers are wet out until a thickness of 125 mil is obtained. The paste mixture is permitted to cure at room temperature (i.e., 25° C.) for about ½ hour. The SPI gel time (60° C.) is 1 minute and 19 seconds, the SPI cure time (60° C.) is 1 minute and 10 seconds, and the peak exotherm temperature (PET) is 370° F. (188° C.). The high PET contributes to the low shrinkage of the article. The resulting molded article has a shiny appearance and good surface smoothness. The article has a good shrinkage percentage of −0.21% (i.e., it expands).

COMPARATIVE EXAMPLE

A paste mixture of a resin composition is prepared as in Example 1 except no dimethyl-p-toluidine is included. The resulting molded article is dull and has poor surface smoothness. The article has a poor shrinkage percentage of −0.07% (i.e., less expansion).

In the specification and example, there have been disclosed preferred embodiments of the invention, although specific terms are employed, they are used in a generic and descriptive sense only and not for the purpose of limitation, the scope of the invention being defined by the following claims.

That which is claimed:

1. A method of producing a molded article comprising the steps of:
   (a) forming a resin composition comprising a thermosetting unsaturated polyester resin, a mixture of thermoplastic polymers of vinyl acetate and an epoxy compound having at least one 1,2-epoxy group per molecule, a dialkyl-p-toluidine accelerator, a low temperature free radical peroxide initiator, and an alkali metal or transition metal compound capable of reacting with the free radical initiator to initiate polymerization of the unsaturated polyester resin;
   (b) forming a shaped article from the resin composition; and
   (c) subjecting the shaped article to a temperature of about 20° C. to about 40° C. to polymerize the thermosetting resin composition to provide a molded article.

2. A method according to claim 1 wherein the resin composition includes an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

3. A method according to claim 1 wherein the free radical initiator is a blend of cumene hydroperoxide and acetyl acetone peroxide.

4. A method according to claim 1 wherein the free radical initiator is methyl ethyl ketone peroxide.

5. A method according to claim 1 wherein the resin composition includes a filler selected from the group consisting of calcium carbonate, alumina powder, hydrated alumina, quartz powder, crushed silica, calcium sulfate, kaolin, and talc.

6. A method according to claim 1 wherein the transition metal compound capable of reacting with the free radical initiator to initiate polymerization of the unsaturated polyester resin is cobalt naphthenate or cobalt octoate.

7. A method according to claim 1 wherein the dialkyl-p-toluidine accelerator is dimethyl-p-toluidine.

8. A resin composition moldable at room temperature comprising:
   (a) a thermosetting unsaturated polyester resin;

(b) a mixture of thermoplastic polymers of vinyl acetate and a thermosetting epoxy compound having at least one 1,2-epoxy group per molecule;
(c) a dialkyl-p-toluidine accelerator;
(d) a low temperature free radical peroxide initiator; and
(e) a alkali metal compound capable of reacting with the free radical initiator to initiate polymerization of the unsaturated polyester resin.

9. A resin composition according to claim 8 including an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

10. A resin composition according to claim 8 wherein the free radical initiator is a blend of cumene hydroperoxide and acetyl acetone peroxide.

11. A resin composition according to claim 8 wherein the free radical initiator is methyl ethyl ketone peroxide.

12. A resin composition according to claim 8 including a filler selected from the group consisting of calcium carbonate, alumina powder, hydrated alumina, quartz powder, crushed silica, calcium sulfate, kaolin, and talc.

13. A resin composition according to claim 8 wherein the dialkyl-p-toluidine accelerator is dimethyl-p-toluidine.

14. A shaped article comprising the composition of claim 8.

15. A fiber-reinforced resin composition moldable at room temperature comprising:
(a) about 50 to about 75 percent by weight of thermosetting unsaturated polyester resin;
(b) of a mixture of thermoplastic polymers of vinyl about 5 to about 15 percent by weight acetate and a thermosetting epoxy compound having at least one 1,2-epoxy group per molecule;
(c) about 0.05 to about 0.5 percent by weight dimethyl-p-toluidine accelerator;
(d) about 0.5 to about 3.0 percent by weight of a low temperature free radical initiator comprising methy ethyl ketone peroxide or a blend of cumene hydroperoxide and acetyl acetone peroxide;
(e) about 0.05 to about 0.5 percent by weight of an alkali metal salt capable of reacting with the free radical initiator to initiate polymerization of the unsaturated polyester resin; and
(f) about 10 to about 40 percent by weight of a reinforcement fiber.

16. A resin composition according to claim 15 including an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

17. A resin composition according to claim 15 including a filler selected from the group consisting of calcium carbonate, alumina powder, hydrated alumina, quartz powder, crushed silica, calcium sulfate, kaolin, and talc.

18. A resin composition according to claim 15 wherein the reinforcement fiber is selected from the group consisting of fibers of glass, carbon, aromatic polyamides, ceramic and metal.

19. A shaped article comprising the resin composition of claim 15.

* * * * *